United States Patent
Kim et al.

(10) Patent No.: US 8,861,450 B2
(45) Date of Patent: Oct. 14, 2014

(54) METHOD FOR TRANSMITTING/RECEIVING A CONTROL SIGNAL IN A MOBILE COMMUNICATION SYSTEM

(75) Inventors: Su Nam Kim, Gyeonggi-do (KR); Ki Seon Ryu, Gyeonggi-do (KR); Jin Soo Choi, Gyeonggi-do (KR); Bin Chul Ihm, Gyeonggi-do (KR); Jeong Ki Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 13/141,204

(22) PCT Filed: Dec. 16, 2009

(86) PCT No.: PCT/KR2009/007515
§ 371 (c)(1),
(2), (4) Date: Jun. 21, 2011

(87) PCT Pub. No.: WO2010/071351
PCT Pub. Date: Jun. 24, 2010

(65) Prior Publication Data
US 2011/0255498 A1    Oct. 20, 2011

Related U.S. Application Data

(60) Provisional application No. 61/139,620, filed on Dec. 21, 2008.

(30) Foreign Application Priority Data

May 22, 2009   (KR) .................. 10-2009-0044902

(51) Int. Cl.
*H04W 4/00* (2009.01)
*H04W 72/04* (2009.01)

(52) U.S. Cl.
CPC .................... *H04W 72/042* (2013.01)
USPC ........................... 370/329; 455/450

(58) Field of Classification Search
None
See application file for complete search history.

(56) References Cited

U.S. PATENT DOCUMENTS

| 7,974,177 | B2 * | 7/2011 | Ofuji et al. ................ 370/203 |
| 8,059,609 | B2 * | 11/2011 | Kim et al. ................ 370/334 |
| 8,059,735 | B2 * | 11/2011 | Shen et al. ................ 375/260 |

(Continued)

FOREIGN PATENT DOCUMENTS

| KR | 10-0557150 B | 3/2006 |
| KR | 2006-0082129 | 7/2006 |
| KR | 10-0605912 B | 8/2006 |
| KR | 2008-0000206 | 1/2008 |

OTHER PUBLICATIONS

International Search Report from PCT/KR2009/007515 (PCT corresponding to present application), Apr. 21, 2011.

*Primary Examiner* — Gregory Sefcheck
(74) *Attorney, Agent, or Firm* — Morgan, Lewis & Bockius LLP (57) ABSTRACT

A method for transmission of a downlink control message in a mobile communication system is provided. Said method comprises a step wherein user-specific control information (USCI) on a plurality of user equipment (UE) is arranged to generate a series of control message at a base station and a step wherein said control messages that have been generated are transmitted. The arrangement sequence value of a specific type of USCI within said control message is used as channel allocation information regarding the UE to which said specific USCI is transmitted.

2 Claims, 6 Drawing Sheets

(56) References Cited

U.S. PATENT DOCUMENTS

| | | | |
|---|---|---|---|
| 8,169,950 B2* | 5/2012 | Shen et al. | 370/328 |
| 8,184,579 B2* | 5/2012 | Shen et al. | 370/329 |
| 8,195,176 B2* | 6/2012 | Kim et al. | 455/450 |
| 8,228,936 B2* | 7/2012 | Inoue et al. | 370/441 |
| 8,254,244 B2* | 8/2012 | Montojo et al. | 370/207 |
| 8,259,636 B2* | 9/2012 | Hus et al. | 370/312 |
| 8,311,053 B2* | 11/2012 | Choi | 370/442 |
| 8,316,269 B2* | 11/2012 | Zhang et al. | 714/748 |
| 8,351,382 B2* | 1/2013 | Lunttila et al. | 370/329 |
| 2005/0159163 A1 | 7/2005 | Chang et al. | |
| 2007/0298809 A1 | 12/2007 | So | |
| 2008/0311919 A1* | 12/2008 | Whinnett et al. | 455/447 |
| 2009/0196238 A1* | 8/2009 | Cheng et al. | 370/329 |
| 2009/0245198 A1* | 10/2009 | Tiirola et al. | 370/330 |
| 2011/0255498 A1* | 10/2011 | Kim et al. | 370/329 |
| 2011/0310784 A1* | 12/2011 | Park | 370/312 |

* cited by examiner

METHOD FOR TRANSMITTING/RECEIVING A CONTROL SIGNAL IN A MOBILE COMMUNICATION SYSTEM

The present application is a national stage of PCT International Application No. PCT/KR2009/007515 filed Dec. 16, 2009, and claims the benefit of U.S. Provisional Application No. 61/139,620, filed Dec. 21, 2008. The present national stage application also claims the benefit of Korean Patent Application No. 10-2009-0044902, filed May 22, 2009.

FIELD OF THE INVENTION

The present invention relates to a method for transmitting a downlink control message in a wireless mobile communication system.

BACKGROUND ART

Figure 1:
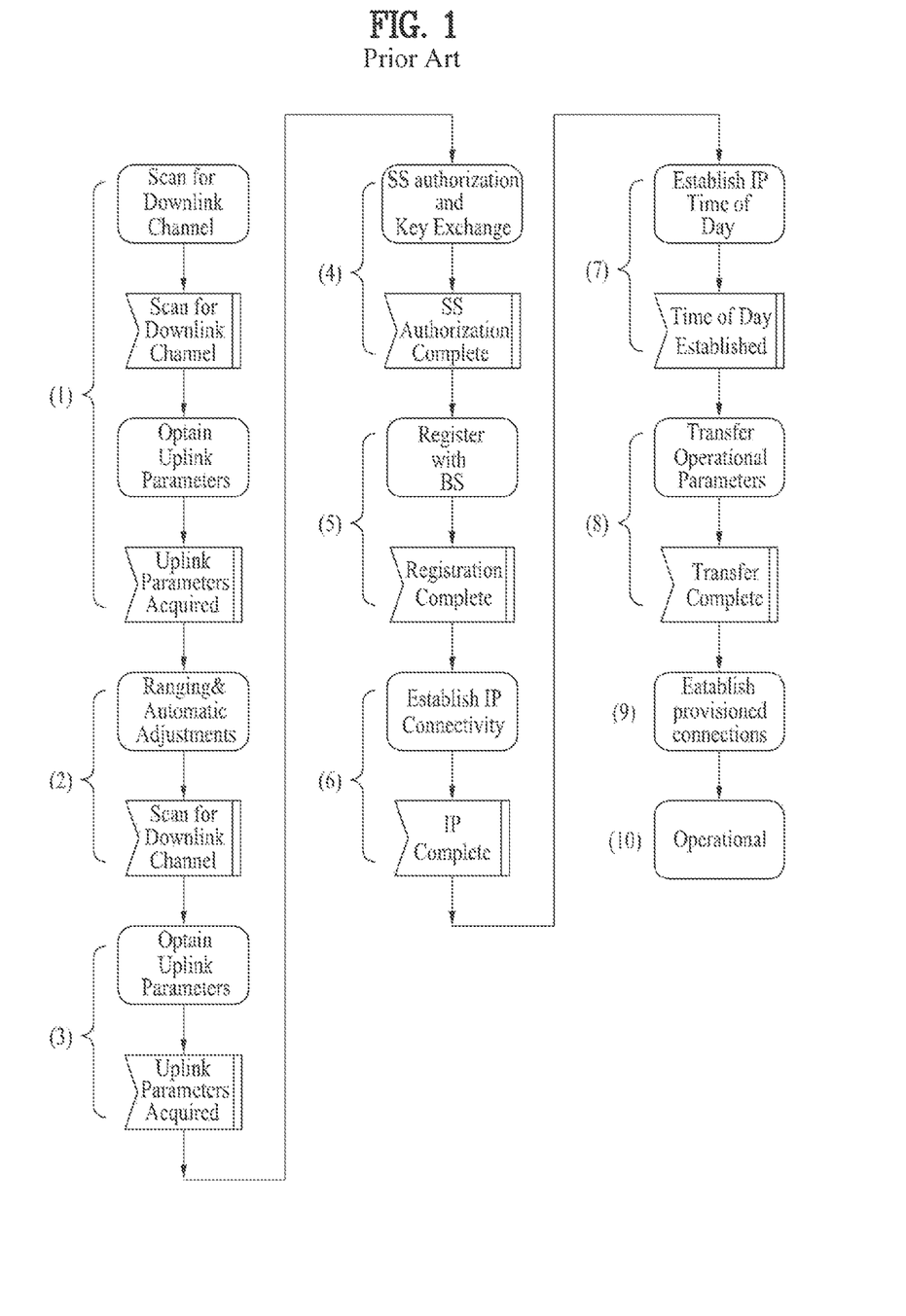
FIG. 1 is a flowchart illustrating a network entry procedure when a UE is initialized in a broadband wireless access system.

FIG. 1 is a flowchart illustrating a network entry procedure when a user equipment (UE) is initialized in a broadband wireless access system.

(1) When initially powered on, a UE searches for a downlink channel and acquires uplink/downlink synchronization with a base station (BS). In this case, the UE acquires uplink/downlink channel parameters by receiving a downlink-MAP (DL-MAP) message, an uplink-MAP (UL-MAP) message, a downlink channel descriptor (DCD) message, and an uplink channel descriptor (UCD) message.

(2) The UE performs ranging with the BS to adjust uplink transmission parameters and receives a basic management connection identifier (CID) and a primary management CID from the BS.

(3) The UE negotiates basic capabilities with the BS.

(4) The UE executes authorization.

(5) The UE registers itself with the BS. The UE managed by an Internet Protocol (IP) receives a secondary management CID from the BS.

(6) The UE establishes IP connectivity.

(7) A current date and time are established.

(8) Constituent files of the UE are downloaded from a trivial file transfer protocol (TFTP) server.

(9) Connection for a prepared service is established.

A physical layer of a broadband wireless access system is divided into a single-carrier type and a multi-carrier type. The multi-carrier type uses orthogonal frequency division multiplexing (OFDM), and introduces orthogonal frequency division multiple access (OFDMA) as an access method capable of allocating resources in units of subchannels grouping a part of carriers.

In an OFDMA physical layer, active carriers are separated into groups and the separated carriers are transmitted to different receiving ends. A group of carriers transmitted to one receiving end is called a subchannel. Carriers constituting each subchannel may be adjacent to each other or may be separated from each other at regular intervals. Since such multiple accesses in units of subchannels are possible, a frequency diversity gain, a gain caused by concentration of power, and forward power control can be efficiently performed although complexity of implementation is increased.

A slot allocated to each user is defined by a data region of a two-dimensional time-frequency space and represents a set of successive subchannels allocated by bursts. In OFDMA, one data region is illustrated by a rectangular determined by time coordinates and subchannel coordinates. Such a data region is allocated to uplink of a specific user or, in downlink, can be transmitted by a BS to a specific user. To define the data region in two-dimensional space, the number of OFDM symbols in a time domain and the number of successive subchannels starting at a position separated from a reference point by offset should be determined.

On the other hand, the base station (BS) transmits downlink or uplink resource allocation information and a variety of control messages associated with individual operations to the user equipment (UE). The UE communicates with the base station (BS) using such messages. In this case, a method for configuring a control message and a method for transmitting the control message should be optimally designed in consideration of the whole system overhead.

When configuring such a control message, the category of the control message may be determined using a unique method for each system, and a method for transmitting a control message may be decided in various ways.

Specifically, the Institute of Electrical and Electronics Engineers (IEEE) 802.16m system classifies a control message into User Specific Control Information (USCI) and Non-User Specific Control Information (NUSCI). The USCI may be referred to as a User Specific Advanced Map (User Specific A-Map). The USCI is designed to transmit a specific-purposed control message to a specific user or group, whereas the NUSCI is designed to transmit control information to all users.

The USCI may be classified into various types according to various purposes, for example, DownLink Resource Allocation type (DL-RA type), Uplink Resource Allocation type (UL-RA type), DL-Persistent Resource Allocation type (DL-Persistent RA type), UL-Persistent Resource Allocation type (UL-Persistent RA type), power control information type, and the like. The persistent resource allocation allocates resources for a predetermined duration at intervals of a predetermined time by assigning periodic characteristics to resource allocation.

On the other hand, a user equipment (UE) needs to be assigned a separate channel for transmitting a signal such as ACK(ACKnowledgement)/NACK(Negative ACKnowledgment) so as to smoothly communicate with a base station (BS). Information regarding the separate channel allocation must be contained in the USCI. In this case, said information can be transmitted to each UE or group by a field generated at a USCI belonging to a specific type (e.g., DL-RA type) in which said information should be transmitted. However, when transmitting a control message in terms of the effective use of transmission (Tx) resources, a method for effectively transmitting said information is needed.

DETAILED DESCRIPTION OF THE INVENTION

Technical Problem

An object of the present invention devised to solve the conventional problem is to provide a method for transmitting a downlink control message in a wireless communication system in such a manner that the control message is optimized by preventing transmission resources from being wasted.

Technical Solution

The object of the present invention can be achieved by providing a method for transmitting a downlink control message in a mobile communication system including generating, by a base station (BS), a series of control messages by arranging a plurality of User Specific Control Informations (USCIs) for a plurality of user equipments (UEs), and transmitting, by the base station (BS), the generated control messages, wherein an arrangement sequence value of USCIs of a specific type in the control messages is used as channel allocation information for a UE to which the specific USCI is transmitted.

The channel allocation information may be ACK(ACKnowledgement)/NACK(Negative ACKnowledgment) channel allocation information.

The channel allocation information may be Channel Quality Information (CQI) channel allocation information.

The generating of the control messages may include grouping the same types from among the specific-type USCIs, and successively arranging the grouped USCIs.

The specific type may be at least one of a downlink resource allocation type, an uplink resource allocation type, a downlink persistent resource allocation type, an uplink persistent resource allocation type, and power control information type.

The base station (BS) may allocate the USCIs to a logical resource region or a physical region. The method may further comprise including configuration information including at least one of a position of the specific-type USCI contained in a logical region, a USCI size of each type, an MCS (Modulation and Coding Scheme) level of each type, a total number of USCIs of each type, and a size of total resources for each type in Non User Specific Information (NUSCI), and transmitting the NUSCI to the UE.

In another aspect of the present invention, a method for transmitting an uplink control signal in a mobile communication system includes receiving a series of control messages from a base station (BS) by arranging a plurality of User Specific Control Informations (USCIs) for a plurality of user equipments (UEs), and transmitting, by a user equipment (UE), a control signal via an uplink using the received control message, wherein an arrangement sequence value of USCIs of a specific type allocated to the UE in the control messages is used as channel allocation information for transmitting the control signal.

The control signal is an ACK(ACKnowledgement)/NACK (Negative ACKnowledgment) signal.

The control signal may be a Channel Quality Information (CQI) signal.

The control messages may be successively arranged by grouping the same types from among the specific-type USCIs.

The specific type may be at least one of a downlink resource allocation type, an uplink resource allocation type, a downlink persistent resource allocation type, an uplink persistent resource allocation type, and power control information type.

The method may further include receiving Non User Specific Information (NUSCI) including configuration information, wherein the configuration information includes at least one of a position of the specific-type USCI contained in a logical region, a USCI size of each type, an MCS (Modulation and Coding Scheme) level of each type, a total number of USCIs of each type, and a size of total resources for each type.

Effects of the Invention

According to the embodiments of the present invention, since the position order value of a user-specific A-Map of a UE is used as ACK/NACK channel allocation information for the corresponding UE, it is not necessary to separately transmit ACK/NACK channel allocation information to the UE, so that a waste of transmission resources is prevented and a control message can be optimized.

BEST MODE FOR CARRYING OUT THE INVENTION

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Reference will now be made in detail to the embodiments of the present invention, examples of which are illustrated in the accompanying drawings. Wherever possible, the same reference numbers will be used throughout the drawings to refer to the same or like parts.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may confuse the substance of the present invention, are not explained. Additionally, procedures or steps, which can be understood by those skilled in the art, are not explained as well.

In exemplary embodiments of the present invention, a description is made of a data transmission and reception relationship between a base station (BS) and a Mobile Station (MS). Herein, the term 'BS' refers to a terminal node of a network, which communicates directly with the MS. In some cases, a specific operation described as being performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point (AP)', etc. The term 'MS' may be replaced with the term 'User Equipment (UE)', 'Subscriber Station (SS)', 'Mobile Subscriber Station (MSS)', 'mobile terminal', 'terminal', etc.

A transmitter means a fixed or mobile node that transmits voice or data service and a receiver means a fixed or mobile node that receives voice or data service. Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

Specific terms used for the exemplary embodiments of the present invention are provided to aid in understanding of the present invention. These specific terms may be replaced with other terms within the scope and spirit of the present invention.

A description will be given below of a method for transmitting a downlink control message in a mobile communication system that can be applied to the embodiments of the present invention.

Figure 2:
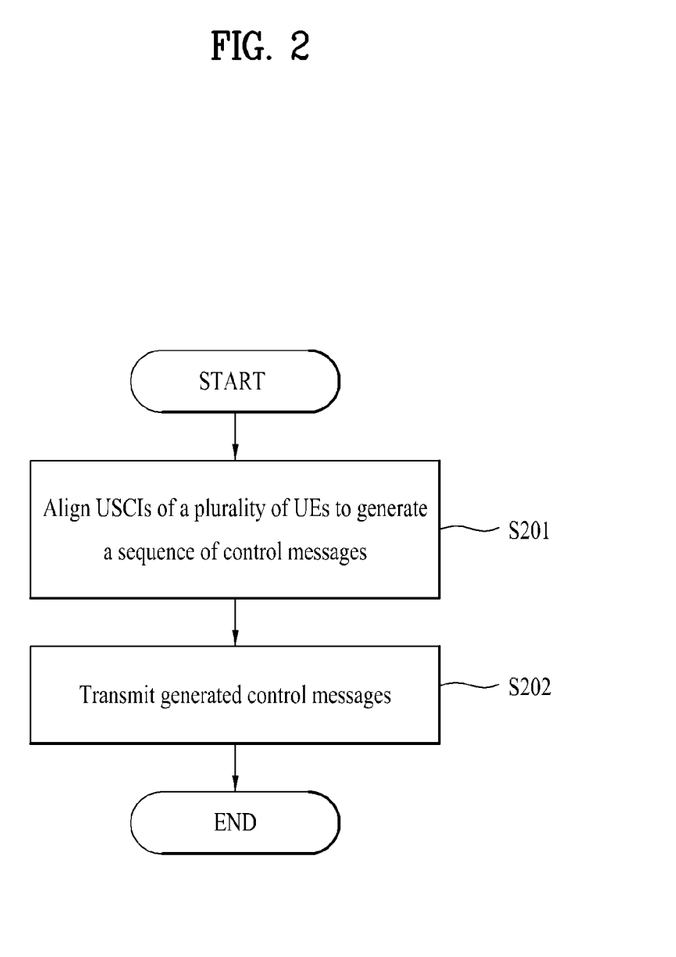
FIG. 2 is a flowchart illustrating a method for transmitting a control message according to an embodiment of the present invention.

FIG. 2 is a flowchart illustrating a method for transmitting a control message according to an embodiment of the present invention.

Referring to FIG. 2, a base station (BS) arranges a plurality of user specific control informations (USCIs) for a plurality of UEs, and generates a series of control messages (Step S201).

In this case, if a specific type that must include channel allocation information (ACK/NACK channel allocation information or CQI feedback information) is present in a plurality of USCI types contained in the control messages, and USCIs of the specific type are simultaneously grouped and arranged. At least one type that must include channel allocation information may be present in a plurality of USCI types contained in the control messages. For example, if specific types that must include channel allocation information from among a plurality of USCI types contained in the control messages are an uplink resource allocation (UL-RA) type and a downlink resource allocation (DL-RA) type, USCIs of the UL-RA type are grouped and arranged together, and USCIs of DL-RA type are grouped and arranged together. In addition, USCIs, each of which need not include channel allocation information, from among USCI types contained in the control messages are separately grouped and arranged.

In case of configuring the control messages as described above, USCIs that must include channel allocation information are grouped and arranged, so that they have an arrangement sequence value and the arrangement sequence value may be used as channel allocation information. Thereafter, the BS transmits the generated control messages to each UE (Step S202).

Figure 3:
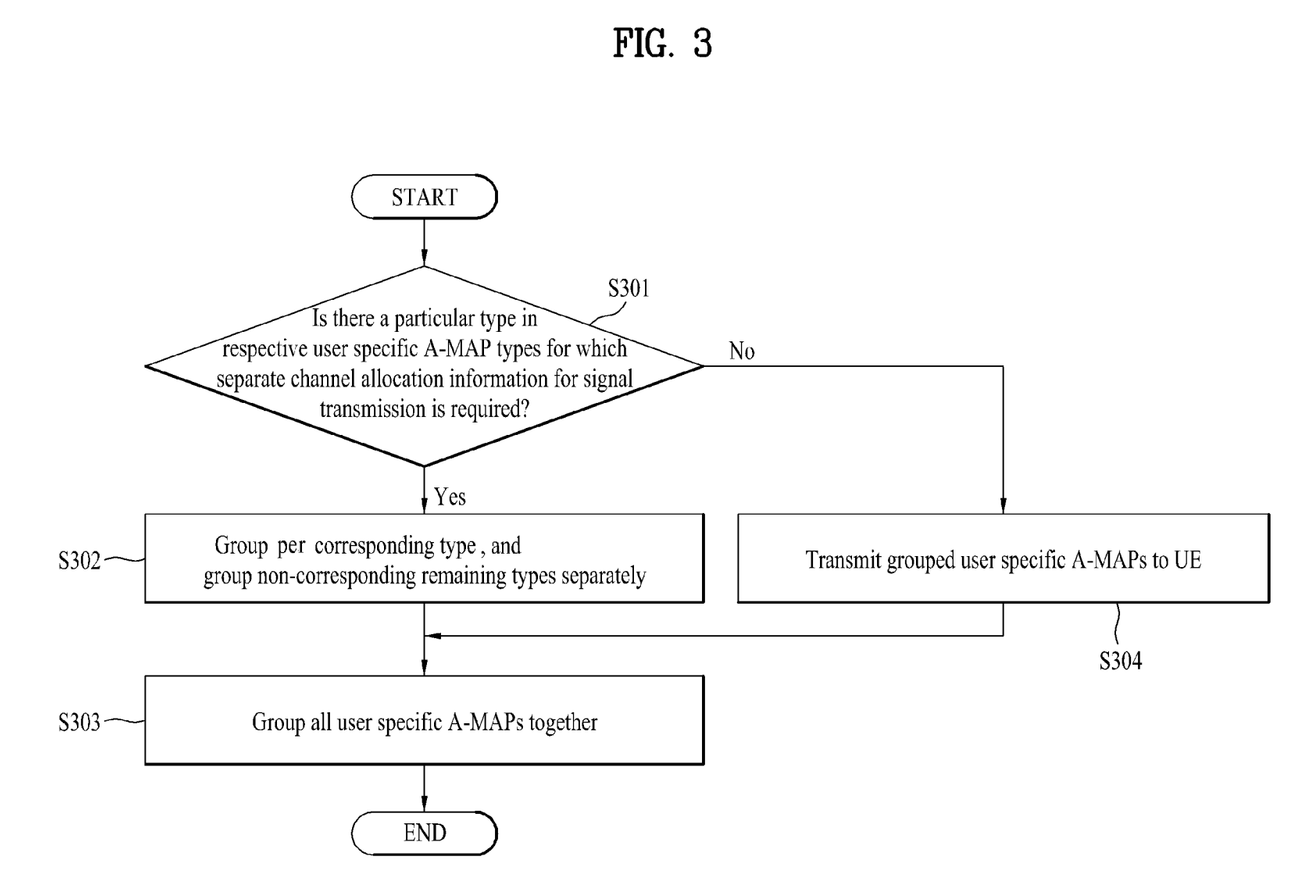
FIG. 3 is a detailed flowchart illustrating a method for transmitting a control message according to the present invention.

FIG. 3 is a detailed flowchart illustrating a method for transmitting a control message according to the present invention.

Referring to FIG. 3, the BS determines whether or not there is a USCI that must include separate channel allocation information for transmitting a signal such as ACK/NACK (Step S301). That is, the BS determines whether or not a specific type that must include separate channel allocation information is in a plurality of USCI types (e.g., DownLink Resource Allocation type (DL-RA type), Uplink Resource Allocation type (UL-RA type), DL-Persistent Resource Allocation type (DL-Persistent RA type), UL-Persistent Resource Allocation type (UL-Persistent RA type), and power control information type.

In case of generating the control message, if USCIs of specific types, that must include separate channel allocation information for transmitting a signal such as ACK/NACK, from among a plurality of USCI types contained in the control message are present, the specific-type USCIs are grouped and arranged, and the remaining types are separately grouped and arranged (Step S302).

For example, if only the DL-RA type from among USCI types contained in the control message has to include channel allocation information for transmitting ACK/NACK signals, USCIs of the DL-RA type are grouped and arranged, and USCIs of the remaining types are separately grouped and arranged, so that a control message is generated. In this case, USCIs of the DL-RA type are grouped, so that the arrangement sequence value of the DL-RA type may be used as channel assignment information.

Thereafter, the BS transmits the grouped USCIs to the UE (Step S303).

The arrangement sequence value of each USCI of the DL-RA type may be used as ACK/NACK channel allocation information of a UE to which each USCI is to be transmitted. Upon receiving USCI configuration information from the BS, the UE may recover its own USCI using the received configuration information, and at the same time may map the resultant USCI to ACK/NACK channel allocation value using the USCI arrangement sequence value.

On the other hand, if a specific type that must include separate channel allocation information for transmitting a signal such as ACK/NACK is not present, USCIs are not classified and grouped according to individual types, but all USCIs are simultaneously grouped together (Step S304).

As described above, the USCI arrangement sequence value transmitted to the UE is used as ACK/NACK channel allocation information for the corresponding UE, so that the ACK/NACK channel allocation information need not be separately transmitted to the UE, resulting in reduction of overhead.

While the above-mentioned description exemplarily discloses the DL-RA type, the above-mentioned scheme for using the USCI arrangement sequence value of each UE as ACK/NACK channel allocation information may also be applied to the UL-RA type.

However, the above-mentioned scheme may not be necessary according to a specific condition. For example, assuming that a synchronous HARQ (Hybrid Automatic Retransmission Request) is applied to an uplink, the UE may retransmit data irrespective of the presence or absence of UL-RA type, so that it is impossible for ACK/NACK channel allocation information of the corresponding UE to be matched with the USCI arrangement sequence of the corresponding UE contained in the UL-RA type.

Therefore, if the BS determines the necessity of ACK/NACK channel allocation for each type in consideration of the above-mentioned condition, the corresponding-type control messages are grouped and transmitted in such a manner that the UE may use the USCI arrangement sequence value as ACK/NACK channel allocation information.

A method for transmitting a control message according to the embodiments of the present invention will hereinafter be described.

(Embodiment 1)

Figure 4:
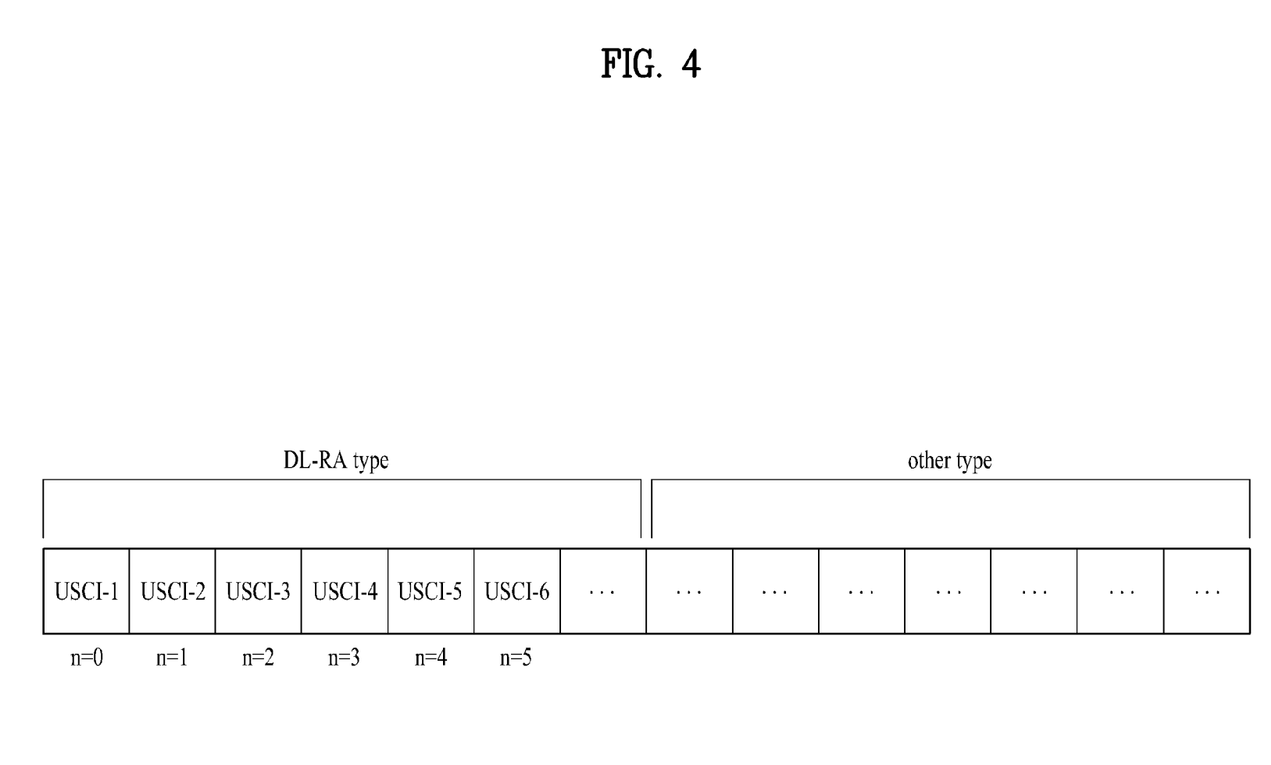
FIG. 4 illustrates a control message structure according to a first embodiment of the present invention.
Figure 5:
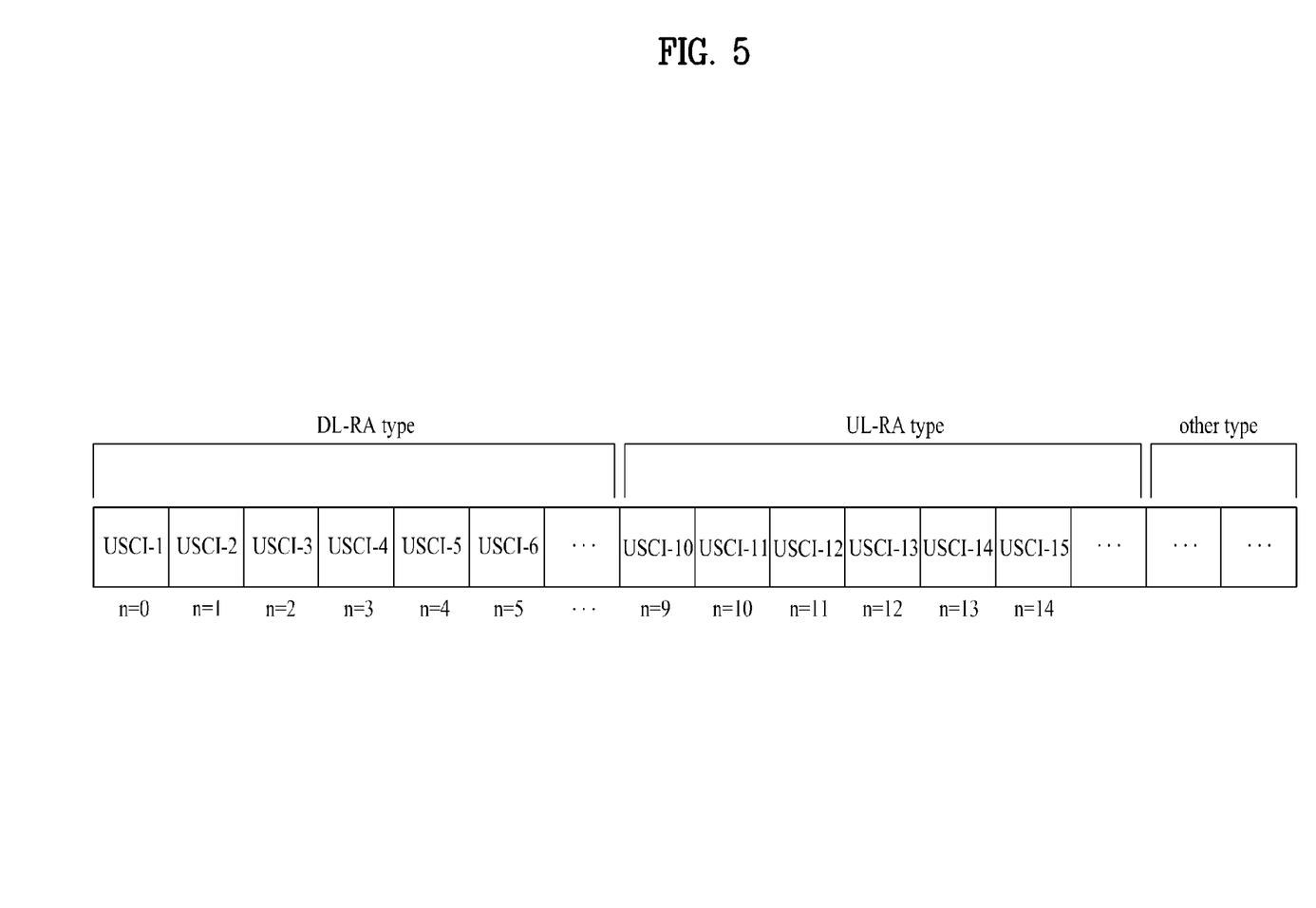
FIG. 5 illustrates a control message structure according to a second embodiment of the present invention.

FIG. 4 illustrates a control message structure according to a first embodiment of the present invention.

In a system, if downlink supports asynchronous HARQ and uplink supports synchronous HARQ, USCIs of the DL-RA type and USCIs of the UL-RA type are separately grouped and transmitted, and the UE recovers its own USCI from among the grouped DL-RA type USCIs and at the same time maps the resultant USCI to the ACK/NACK channel allocation value using the arrangement sequence value (for example, if USCI of the corresponding UE corresponds to USCI-4, n=3 is used.).

(Embodiment 2)

FIG. 4 illustrates a control message structure according to a second embodiment of the present invention.

Provided that both uplink and downlink of the system support asynchronous HARQ, USCIs of the DL-RA type are grouped and arranged, USCIs of the UL-RA type are grouped and arranged, and USCIs of the remaining types are grouped and transmitted. The corresponding UE recovers its own USCI from among USCIs of the DL-RA type, and maps the resultant USCI to the UL ACK/NACK channel allocation value using the arrangement sequence value (for example, if USCI of the corresponding UE is denoted by USCI-2 as shown in FIG. 4, n=1 is used.). The UE recovers its own USCI from among USCIs of the UL-RA type, and maps the resultant USCI to the DL ACK/NACK channel allocation value using the arrangement sequence value (for example, if USCI of the corresponding UE is denoted by USCI-13 as shown in FIG. 4, n=12 is used.).

In other words, assuming that the ACK/NACK channel allocation value is mapped to the arrangement sequence value of the UE's USCI, USCIs of the corresponding type are grouped and transmitted.

Although the above-mentioned grouping is performed in the DL-RA type and the UL-RA type, the scope or spirit of the present invention is not limited thereto, the above-mentioned grouping is applicable to all cases each requiring separate channel allocation so as to transmit an ACK/NACK signal and the like.

In addition, the above-mentioned method can be applied not only to one case in which a separate channel for transmitting the ACK/NACK signal is allocated, but also to other cases in which specific information to be separately allocated to the UE in the same manner as in a CQI (Channel Quality Information) feedback signal may be recognized as USCI position information of the corresponding UE from among the grouped USCIs.

In order to recognize the UE's USCI arrangement sequence from among grouped USCIs belonging to the same type, the UE needs to use configuration information for USCIs. Configuration information for allowing the UE to recognize its own USCI arrangement sequence and a method for transmitting the constituent information will hereinafter be described in detail.

For USCI transmission, a method for transmitting USCI to a fixed position within a resource physical region, and a method for allocating USCI to a logical region of resources may be used.

In case of using the above-mentioned method for allocating the USCI to the logical region, according to the first embodiment, USCIs are classified according to a DL-RA type and other types, the resultant USCIs are located at the logical region and then transmitted, and configuration information of the USCIs are transmitted to each UE through Non User Specific Control Information (NUSCI), such that each UE can recognize its own USCI position information from among the grouped USCIs. In order to assign a separate channel to the UE, the above-mentioned configuration information may include position information of each grouped USCI contained in a logical region, USCI size information (or MCS level information) for each type, information regarding a total number of USCIs for each type, a total resource size for each type, etc.

For example, according to the first embodiment (Embodiment 1), USCIs are classified into the DL-RA type and the remaining types, so that the resultant USCIs are sequentially located in a logical resource unit. Configuration information for each type is transmitted as shown in the following Table 1.

TABLE 1

| Non-User Specific A-Map |
| --- |
| Non-User Specific A-Map { |
| The total number of ULRUs related to the pattern of DL-RA type [M bit] |
| Pattern of DL-RA type [N bit] |
| The total number of ULRUs related to the pattern of Other types [M bit] |
| Pattern of Other types [N bit] |
| }[ULRU: USCI unit] |

Considering the method for transmitting data in a fixed position of the physical region, a start position is fixed at a physical region for each type, and USCIs of individual types are sequentially transmitted at the corresponding fixed position.

By the above-mentioned transmission method, each UE can recognize the USCI arrangement sequence, and the recognized USCI arrangement sequence may be used as channel allocation information for transmitting ACK/NACK signals or the like.

Figure 6:
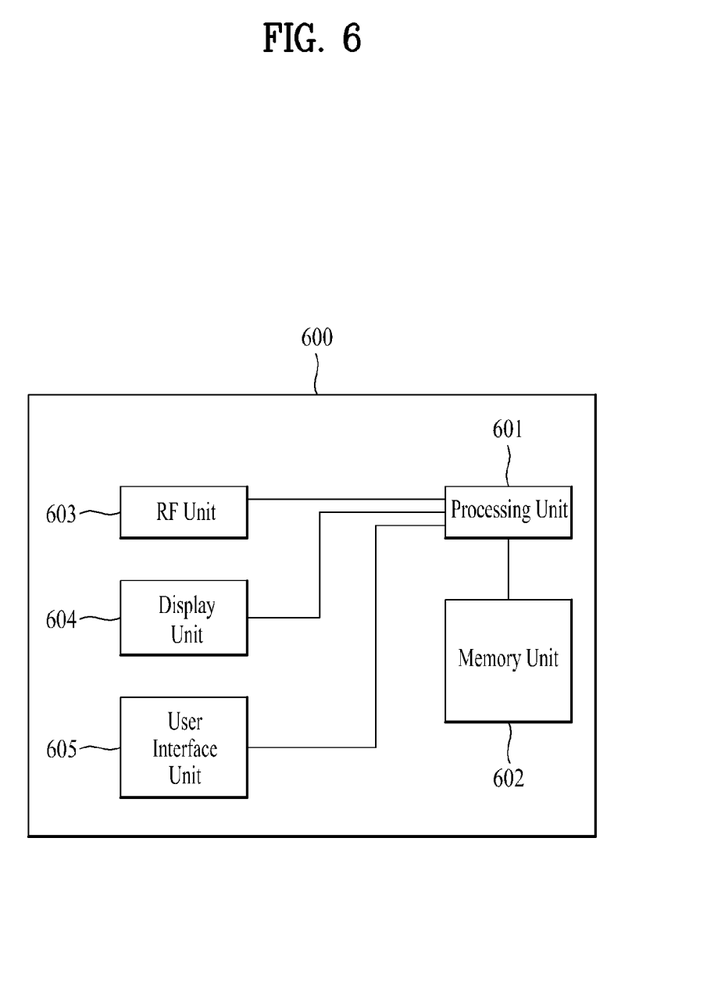
FIG. 6 is a block diagram illustrating a device applicable to either a user equipment (UE) or a base station (BS) according to embodiments of the present invention.

FIG. 6 is a block diagram illustrating a device applicable to either a user equipment (UE) or a base station (BS) according to embodiments of the present invention. Referring to FIG. 16, the device 600 includes a processing unit 610, a memory unit 602, a Radio Frequency (RF) unit 603, a display unit 604, and a user interface unit 605. The layer of a physical interface protocol is performed in the processing unit 601. The processing unit 601 provides a control plane and a user plane. Functions of individual layers may be performed by the processing unit 601. The memory unit 602 is electrically connected to the processing unit 601 and stores an operating system, applications, general files, etc. If the device 600 is a user equipment (UE), the display unit 604 may display various types of information. The display unit 604 may be configured using, but not limited to, a Liquid Crystal Display (LCD), a Light Emitting Diode (LED), an Organic Light Emitting Diode (OLED), etc. The user interface unit 605 may be configured into a combination of known user interfaces such as a keypad, a touch screen, etc. The RF unit 603 electrically connected to the processing unit 601 transmits and receives RF signals.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

Mode for Invention

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

Industrial Applicability

The embodiments of the present invention can be applied to a user equipment (UE), a base station (BS), and other devices.

The invention claimed is:

1. A method for receiving a control signal in a mobile communication system, the method comprising:
    transmitting, to a User Equipment (UE), a control message in which a plurality of User Specific Control Informations (USCIs) are successively arranged per type of USCI group, wherein each USCI has an index number related to a position order of the corresponding USCI in the control message, wherein the type of USCI group includes a type of USCI group for a downlink resource allocation and a type of USCI group for a downlink persistent resource allocation;
    transmitting, to the UE, data using a downlink resource indicated by a USCI corresponding to the UE;
    receiving, from the UE, an ACK (ACKnowledgement)/NACK(Negative ACKnowledgment) signal corresponding to the data, wherein the ACK/NACK signal is transmitted using an uplink resource determined by using the index number of the USCI corresponding to the UE in the control message, and
    transmitting, to the UE, Non User Specific Information (NUSCI) including configuration information including at least one of a position of the USCI in a logical resource region or a physical resource region, a USCI size of each type of USCI group, a Modulation and Coding Scheme (MCS) level for USCIs of each type of USCI group, a total number of USCIs of each type, and a size of total resources for USCIs of each type of USCI group.

2. A method for transmitting a control signal in a mobile communication system, the method comprising:
    receiving, by a User Equipment (UE) from a Base Station (BS), a control message in which a plurality of User Specific Control Informations (USCIs) are successively arranged per type of USCI group, wherein each USCI has an index number related to a position order corresponding USCI in the control message, wherein the type of USCI group includes a type of USCI group for a downlink resource allocation and a type of USCI group for a downlink persistent resource allocation;
    receiving, by the UE from the BS, data using a downlink resource indicated by a USCI corresponding to the UE;
    transmitting, by the UE to the BS, an ACK (ACKnowledgement)/NACK(Negative ACKnowledgment) signal corresponding to the data, wherein the ACK/NACK signal is transmitted using an uplink resource determined by using the index number of the USCI corresponding to the UE in the control message,
    transmitting, to the UE, Non User Specific Information (NUSCI) including configuration information inclding at least one of a position of the USCI in a logical resource region or a physical resource region, a USCI size of each type of USCI group, a Modulation and Coding Scheme (MCS) level for USCIs of each type of USCI group, a total number of USCIs of each type, and a size of total resources for USCIs of each type of USCI group.

* * * * *